(12) United States Patent
Orcutt et al.

(10) Patent No.: US 7,225,258 B2
(45) Date of Patent: May 29, 2007

(54) SYSTEM AND METHOD FOR CONNECTING DYNAMIC NETWORKS WITH LIMITED RESOURCES

(75) Inventors: Edward K. Orcutt, Cave Creek, AZ (US); Randall K. Bahr, Scottsdale, AZ (US); Carl M. Willis, Mesa, AZ (US)

(73) Assignee: General Dynamics Corporation, Scottsdale, AZ (US)

( * ) Notice: Subject to any disclaimer, the term of this patent is extended or adjusted under 35 U.S.C. 154(b) by 794 days.

(21) Appl. No.: 10/238,171

(22) Filed: Sep. 9, 2002

(65) Prior Publication Data
US 2004/0049563 A1    Mar. 11, 2004

(51) Int. Cl.
*G06F 15/173* (2006.01)

(52) U.S. Cl. ............ 709/226; 709/223; 709/226; 709/238; 709/242

(58) Field of Classification Search ........ 709/238–242, 709/245, 223, 226
See application file for complete search history.

(56) References Cited

U.S. PATENT DOCUMENTS

| | | | | |
|---|---|---|---|---|
| 5,430,729 A | * | 7/1995 | Rahnema | 370/409 |
| 5,600,638 A | * | 2/1997 | Bertin et al. | 370/351 |
| 5,884,036 A | * | 3/1999 | Haley | 709/224 |
| 6,061,723 A | * | 5/2000 | Walker et al. | 709/224 |
| 6,069,895 A | * | 5/2000 | Ayandeh | 370/399 |
| 6,438,110 B1 | * | 8/2002 | Rai et al. | 370/254 |
| 6,810,428 B1 | * | 10/2004 | Larsen et al. | 709/238 |
| 6,928,475 B2 | * | 8/2005 | Schenkel et al. | 709/224 |
| 6,947,939 B2 | * | 9/2005 | Fujibayashi et al. | 707/10 |
| 6,963,926 B1 | * | 11/2005 | Robinson | 709/239 |

* cited by examiner

*Primary Examiner*—Nathan J. Flynn
*Assistant Examiner*—Mohamed Wasel
(74) *Attorney, Agent, or Firm*—Ingrassia Fisher & Lorenz, P.C.

(57) ABSTRACT

The present invention provides a network connectivity system and method that facilitate the design of a network connectivity plan where the availability of link resources is limited and varies with the time. The preferred system and methods can be used to provide a network connection plan that fully connects such a network, where possible, while efficiently allocating the link resources used to implement the network connection plan. The network connectivity system and method develops the network connection plan by choosing links based on link resource availability and link duration. Thus, the network connectivity system and method creates a connection plan that, if possible, keeps full connectivity in the network, compensating for changes over time in the availability of links. The network connectivity system thus provides the ability to efficiently connect dynamic networks in a way that facilitates the routing of data to between nodes in the communication network.

35 Claims, 10 Drawing Sheets

SYSTEM AND METHOD FOR CONNECTING DYNAMIC NETWORKS WITH LIMITED RESOURCES

STATEMENT OF GOVERNMENT INTEREST

The U.S. Government has a paid-up license in this invention and the right in limited circumstances to require the patent owner to license to others on reasonable terms as provided for by the terms of Contract No. F04701-99-C-0047 awarded by the Department of Defense to TRW Inc., Subcontract No. 61773CD29S to General Dynamics Corporation.

BACKGROUND OF THE INVENTION

This invention generally relates to computer systems, and more specifically relates to networking of computer systems.

Modern life is becoming more dependent upon computer networks. Computer networks have evolved into extremely sophisticated systems, and are used in many different applications. These applications involve everything from basic local area networks, to large scale networks like the internet and satellite communication networks.

As computer networks become more integrated into diverse aspects of daily life, their reliability and efficiency becomes a greater and greater necessity. In order to ensure sufficient reliability it is necessary to ensure that the network remains fully connected. Full connectivity generally requires that every node in the network be able to communicate with every other node in the network.

Maintaining full connectivity in a network is particularly problematic when the configuration of the network changes over time. For example, in satellite communication networks, the relative movement of the satellites can cause some links between satellites to be available only for certain periods of times. In other networks, the failure of connections between computer network nodes can disrupt communications. In both of these examples, the new connections must be made to fully re-connect the network.

Another requirement in some computer networks is that network resources be conserved to whatever extent is possible. For example, it is desirable to minimize the number of communication terminals on network nodes that are utilized to connect a network. Minimizing the number of communication terminals used frees these resources for other uses, conserves power and generally improves the performance of the network.

As the complexity of networks have grown, it has become increasingly difficult to effectively manage network connectivity to provide full connectivity while minimizing excessive resource allocation. This difficulty is particularly acute in those networks where the availability of connections changes over time. Thus, what is needed is a system and method for providing network connectivity that efficiently allocates resources while providing full connectivity to a network where resource availability changes over time.

BRIEF SUMMARY OF THE INVENTION

The present invention provides a network connectivity system and method that facilitate the design of a network connectivity plan where the availability of link resources is limited and varies with the time. The preferred system and methods can be used to provide a network connection plan that fully connects such a network, where possible, while efficiently allocating the link resources used to implement the network connection plan.

The network connectivity system and method develops the network connection plan by choosing links based on link resource availability and link duration. Thus, the network connectivity system and method creates a connection plan that, if possible, keeps full connectivity in the network, compensating for changes over time in the availability of links. The network connectivity system thus provides the ability to efficiently connect dynamic networks in a way that facilitates the routing of data to between nodes in the communication network.

The foregoing and other features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

DETAILED DESCRIPTION OF THE DRAWINGS

Figure 1:
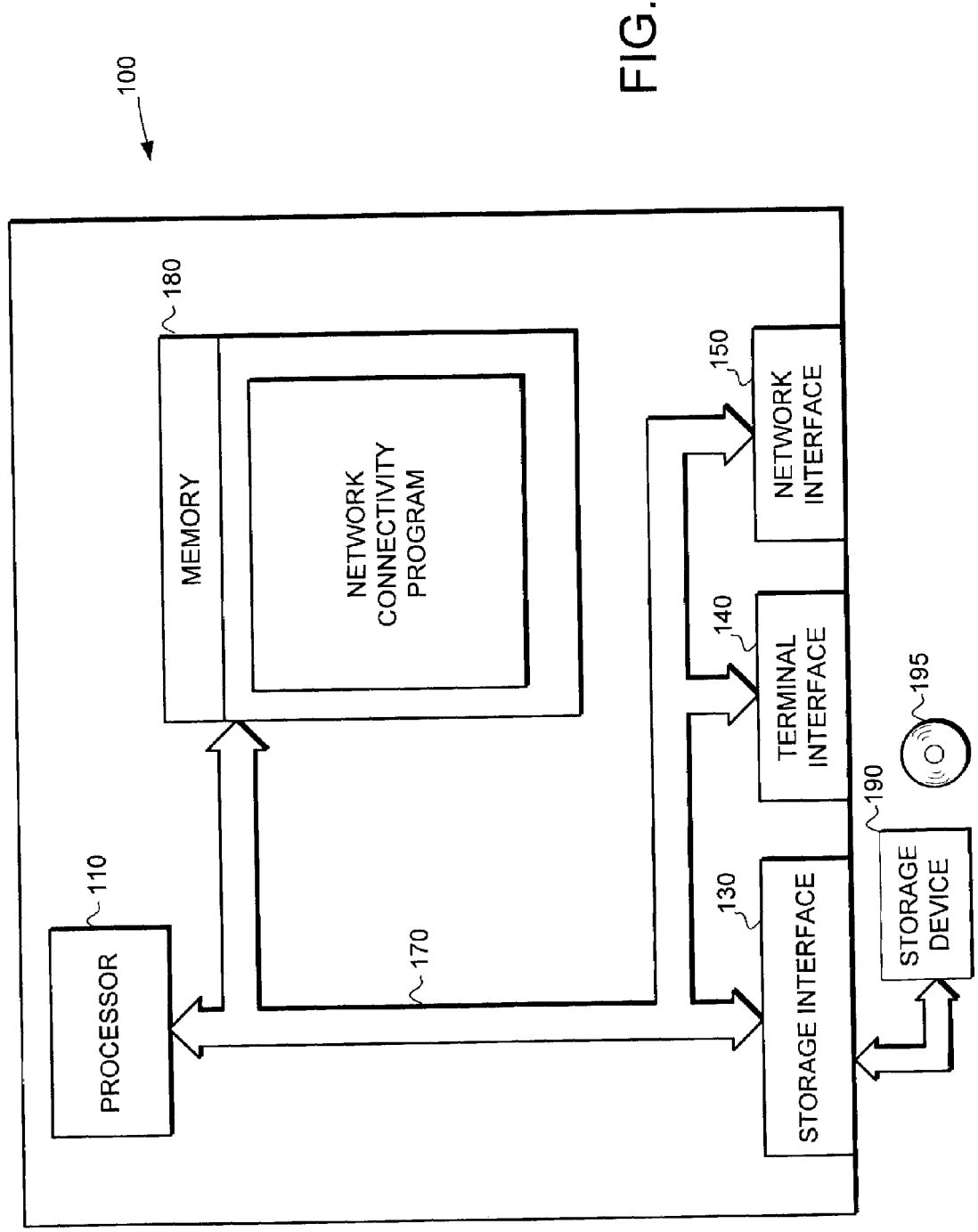
FIG. 1 is a schematic view of a computer system including a network connectivity program.

The present invention provides a network connectivity system and method that facilitate the design of a network connectivity plan where the availability of link resources is limited and varies with the time. The preferred system and methods can be used to provide a network connection plan that fully connects such a network, where possible, while efficiently allocating the link resources used to implement the network connection plan.

In this application, the term "network" shall refer to any collection of devices that are connected with communication links to allow exchange of data between them. The term "link" refers in general to the resources used to provide a communication connection between nodes in the network. Examples of networks include computer networks, communication networks, and networks of other electronic devices. Examples of links include terrestrial wirelines between network nodes, RF connections between cellular phones and a cellular base station, and RF connections between a satellite and an Earth ground station. The network connectivity system and method is particularly applicable to networks where available links between nodes in the network vary over time. For example, where the geometry between nodes varies and changes the available links with time in a known manner. An example of such a network is a network of satellites. In some satellite networks the relative location of individual satellites varies periodically over time. The change in relative location of the individual satellites changes the availability of links between satellites. The availability of links in satellite networks is also an issue in that, by their nature satellites can have a limited number of connections and are sensitive to increases in size, weight and power consumption.

In this application, the term "connected network" refers to a network of devices in which some path permitting exchange of data exists between any pair of nodes in the network. Thus, any node can communicate through the network to any other node. A "static link" refers to a connection between two nodes that, under normal operation, is continuously available and intact. A "dynamic link" refers to a connection between two nodes that is intact for only a portion or portions of time. A dynamic link thus is not continuously available to form links between nodes in the network. A "supernode" is a group of at least one network devices that are generally connected together by static links. Thus, a supernode is a collection of devices that are continuously connected unless a link within the supernode fails. A supernode can comprise a single network device, but in most cases they will comprises multiple network devices. In this application, the term "node" will be used to refer to devices on the network. It should be noted that the term node can be used to refer to a single network device, or a collection of network devices that are treated as one entity by the network.

During operation, the network connectivity system determines which dynamic links to use to fully connect the network. The network connectivity system chooses which dynamic links to use based on the duration and availability of dynamic links and availability of the resources required to affect those links. This includes taking into account when the availability of dynamic links changes, such that new links can be provided to fully connect the network over all time periods. Additionally, the network connectivity system can be used to compensate for an unexpected failure in a node by reworking the network connections to again fully connect the network.

The network connectivity system and method develops the network connection plan by first determining available links between nodes and groups of nodes and the time intervals for which these links are available. The system then proceeds to a building phase that designs an initial connection plan that connects the network for an initial time interval. The system does so by first selecting links based upon the number of links available to each node, to first allow connections to be made to nodes that have the fewest available links. This increases the probability that link resources are allocated such that the network can establish and maintain connectivity. If at some point the network is unable to be fully connected, the system partially disassembles the network connectivity plan, disconnecting nodes to allow the reallocation of link resources to be evaluated.

When the connection plan is completed for the initial time period, the system moves onto a maintenance phase in which the system attempts to maintain the network in a connected state for the remaining time periods. Because dynamic links are available only for finite time intervals, the network can become disconnected as links expire unless new links are established to replace expiring links. The system determines which of the current links will expire first and then determines the best available link to replace or follow the expiring link. The system continues to operate in the maintenance phase, replacing expiring links with new links to maintain the network in a connected state, until a connection plan for a specified time period has been completed.

Thus, the network connectivity system and method creates a connection plan that, if possible maintains full connectivity in the network, compensating for changes over time in the availability of links. For those cases where limited resources and/or geometrical constraints make it is impossible to maintain continuous network connectivity, the network connectivity system finds a solution that delays the occurrence of the network losing full connectivity for as long as possible.

Additionally, the network connectivity system and method can be used to compensate for unexpected failures. When an unexpected failure in a node or communication link occurs, the system can be used to rework the links in the network to return the network to a fully connected state.

Turning now to FIG. 1, an exemplary computer system 100 is illustrated. Computer system 100 illustrates the general features of a computer system that can be used to implement the invention. Of course, these features are merely exemplary, and it should be understood that the invention can be implemented using different types of hardware that can include more or different features. It should be noted that the invention can be implemented in a single stand alone computer system, or can be implemented as part of a distributed system. For example, when the system is used in a satellite network the computer system can be implemented on the ground or on one the satellites in the network themselves. Which implementation is used would depend on factors such as mean-time-to-repair requirements and cost of computer resources on the satellite. The exemplary computer system 100 illustrated in FIG. 1 is meant to provide an example of the general features that could be found in an on-the-ground or on-the-satellite implementation. The exemplary computer system 100 includes a processor 110, a storage interface 130, a terminal interface 140, a network interface 150, a storage device 190, a bus 170 and a memory 180. In accordance with the preferred embodiments of the invention, the memory system 100 includes a network connectivity program.

The processor 110 performs the computation and control functions of the system 100. The processor 110 may comprise any type of processor, include single integrated circuits such as a microprocessor, or may comprise any suitable number of integrated circuit devices and/or circuit boards working in cooperation to accomplish the functions of a processing unit. In addition, processor 110 may comprise multiple processors implemented on separate computer systems, such as a system where a first processor resides on a first computer system and a second processor resides on a second computer system. During operation, the processor 110 executes the programs contained within memory 180 and as such, controls the general operation of the computer system 100.

Memory 180 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 180 may be a single type of memory component, or it may be composed of many different types of memory components. In addition, the memory 180 and the processor 110 may be distributed across several different computers that collectively comprise system 100. For example, a portion of memory 180 may reside on a first hardware system and another portion may reside on a second hardware system.

The bus 170 serves to transmit programs, data, status and other information or signals between the various components of system 100. The bus 170 can be any suitable physical or logical means of connecting computer systems and components. This includes, but is not limited to, direct hard-wired connections, fiber optics, infrared and wireless bus technologies.

The terminal interface 140 allows users to communicate with system 100, and can be implemented using any suitable method and apparatus. The network interface 150 allows the computer system 100 to communicate with other systems, and can be implemented using any suitable method and apparatus. The storage interface 130 represents any method of interfacing a storage apparatus to a computer system. Storage device 190 can be any suitable type of storage apparatus, including direct access storage devices such as hard disk drives, floppy disk drives and optical disk drives. As shown in FIG. 1, storage device 190 can comprise a CD type device that uses optical discs 195 to store data.

In accordance with the preferred embodiments of the invention, the memory system 100 includes the network connectivity program. During operation, the network connectivity program is stored in memory 180 and executed by processor 110. The network connectivity program creates a connection plan that facilitates network links such that any node in the network has a path to any other node in the network, provided that such a path is physically realizable.

It should be understood that while the present invention is described in the context of a fully functioning computer system, those skilled in the art will recognize that the mechanisms of the present invention are capable of being distributed as a program product in a variety of forms, and that the present invention applies equally regardless of the particular type of signal bearing media used to carry out the distribution. Examples of signal bearing media include: recordable media such as floppy disks, hard drives, memory cards and optical disks (e.g., disk 195), and transmission media such as digital and analog communication links, including wireless communication links.

Figure 2:
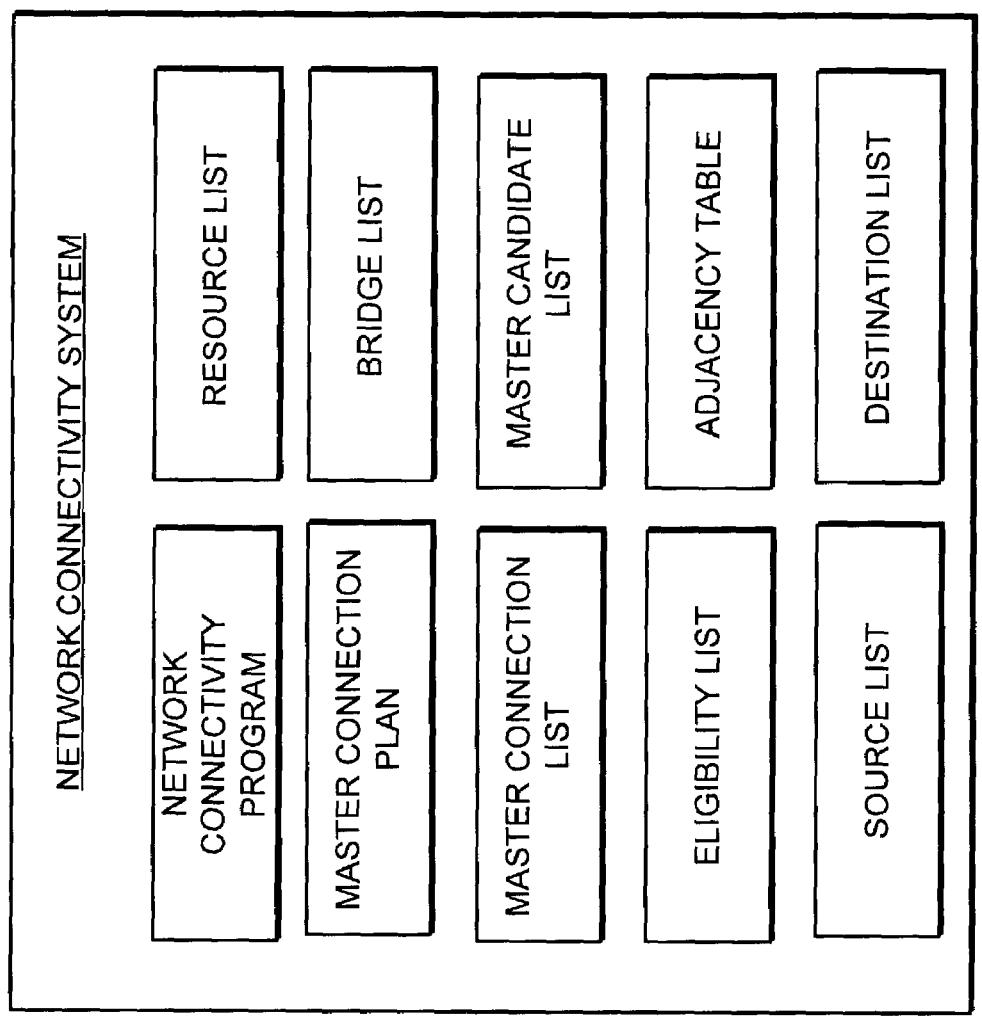
FIG. 2 is a schematic view of a network connectivity system in accordance with preferred embodiments.

Turning now to FIG. 2, a network connectivity system is illustrated schematically, with the main elements of the system illustrated individually. The network connectivity system includes a network connectivity program. The network connectivity program controls the operation of the system to create a master connection plan that fully connects the nodes of the network when possible. When completed, the master connection plan includes a listing of all links used to connect the network. The network connectivity program uses several additional data structures to create the master connection plan. In the illustrated embodiment, these data structures include a master connection list, an eligibility list, a resource list, a bridge list, a master candidate list, an adjacency table, a source list and a destination list.

As stated above, the master connection plan is a listing of all links that are to be used to connect the network. As the network connectivity program processes, new links are added to the master connection plan until the plan describes a connection scheme that connects the network over a complete time cycle. The master connection plan is preferably implemented as a listing of dynamic links in the network. Each dynamic links can be expressed as a list of three 2-tuples of the form $\{\{t_b, t_e\}, \{N_1, N_2\}, \{SN_1, SN_2\}\}$, where the first 2-tuple represents the starting and ending times of the link, the second 2-tuple represents the two node ID's that comprise the link, and the third 2-tuple represents the identities of the supernodes the link connects. A completed master connection plan describes a solution to best connect the network while minimizing the number of resources used.

The master connection list comprises a data structure of the dynamic links available in the network. Specifically, the master connection list lists the links between nodes in the networks and the times that links between nodes are available. Thus, the master connection list provides the basic data that will be used to create the master connection plan. The master connection list can be implemented as a table in a pseudo-matrix form such that the entry in row i and column j includes the time intervals for which links between node i and node j are available. Those nodes that do not have links have null entries. The master connection list is preferably independent of resource status, and thus may typically need to be computed only once for a given defined physical network topology, although changes in the network may require it to be updated over time. The master connection list is effectively a compact description of the universal set of dynamic links that are possible in the network.

The eligibility list provides status information on each node's eligibility for use in forming dynamic links and takes into account the availability of resources on each node. The eligibility list can be implemented in the form of a vector where the ith entry corresponds to node i and is equal to 1 if the node is eligible for executing dynamic links and 0 if ineligible. This list should be updated any time the health status of the network changes. For example, when a network node fails, the entry for that node is changed to 0 in the eligibility list. As another example, if a terminal on a node fails resulting in no free terminals available for making dynamic links, then the entry for that node would be changed to 0 in the eligibility list. The eligibility list is used to help prune from consideration those links in the master connection list that are ineligible due to health or resource limitations on individual nodes.

The resource list is a list of all link resources that are available for each node at a given time period. As links are made, some resources are no longer available and are removed from the resources list. The resource list is also updated as the health status of the nodes in the network changes. The resource list is used to help prune from consideration those candidates from the master connection list that are temporarily ineligible due to their resources being devoted to other dynamic links.

The bridge list is a list of all links currently allocated in the master connection plan at a given time period. The bridge list is updated as links expire and new links are established. The bridge list effectively provides a snapshot of the dynamic links in place and is primarily used to determine which link will next expire, thereby necessitating a replacement. It can also be used to determine how the adjacency matrix should be populated as well as to provide information on resource usage.

The master candidate list is a list of candidate links available to form dynamic links at specified times. The master candidate list thus provides a historical list of links that were available to make a specific connection needed to connect the network. The master candidate list is preferably implemented to include multiple sub-lists, with each sub-list including all the possible link candidates that were available when a corresponding link was chosen. For example, the first entry would contain a list of all possible link candidates that were available and met the connectivity requirements when the first link was chosen to define the first entry made in the master connection plan. Likewise, the seventh entry of the master candidate list is the list of possible links available that meet the connectivity requirements when the seventh link was specified. The master candidate list is used to help resurrect the state of resource usage and identify allowable candidates when the connection plan is partially disassembled to help free up resources needed for another link. This allows for efficient searching for alternative choices to help resolve resource conflicts that prevent needed links from being made. Alternatively, this list could be eliminated to reduce the memory resource requirements needed to implement the connectivity system by recomputing the candidates during disassembly, although this would naturally require additional processing resources.

The adjacency table is a data structure used to indicate links between supernodes. The adjacency table is preferably a binary square matrix with a dimension equal to the number of supernodes in the network. The adjacency table can indicate an existing link between supernodes i and j with a 1 in the ith column and jth row. Likewise, a 0 would indicate that no link exists. As will become clear, the adjacency table is a convenient input to a depth first search (DFS) algorithm used to determine if the network is connected, and if not connected, identify groups of connected supernodes to determine requirements on additional links needed to fully connect the network The source and destination lists are data structures used to help define requirements for dynamic links. Preferably, the source list includes a list of supernodes that are connected to form a subset of the network. The destination list includes a list of supernodes that may or may not be connected to each other, but are such that no link exists between any member of the source list and any member of the destination list. Thus, a necessary condition to complete full connectivity of the network is a supernode in the destination list must be connected to a supernode in the destination list.

Figure 3:
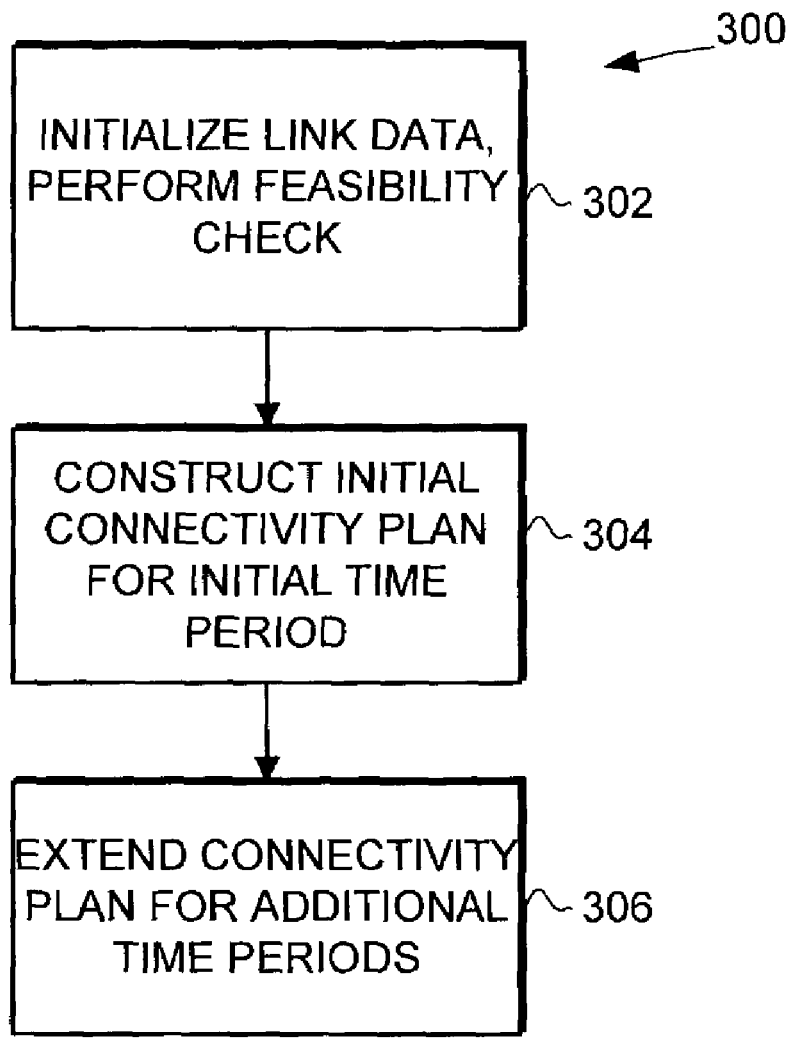
FIGS. 3–10 are flow diagrams illustrating preferred methods for generating a network connectivity plan.

During operation, the network connectivity program generates a master connection plan and updates that plan as changes in node health and resource availability occur. Turning now to FIG. 3, a method 300 for creating a master network connectivity plan is illustrated. The method 300 is used to develop an initial connectivity plan for the network, including accounting for changes in network topology over time. The method 300 also provides the basis for adapting to unforeseen changes in network resources.

The first step 302 in method 300 is to initialize connection data and provide a feasibility check for the network. This step involves the creation of several data structures that will be used to develop the connection plan. Then, with the data structures created, an initial feasibility check can be performed to determine if it is definitely impossible to continuously maintain full connectivity over a designated time period. The step of initializing the connection data and performing a feasibility check will be discussed in greater detail with reference to FIG. 4.

The next step 304 is to construct a connectivity solution for an initial time period. This step creates the initial connectivity plan that will form the basis for the complete plan that covers all time periods. Specifically, the initial connectivity plan results in a fully connected network for the initial time period. The step of completing the initial connectivity plan will be discussed in greater detail with reference to FIG. 5.

The final step 306 is to extend the initial connectivity plan for additional time periods. Specifically, the initial connectivity plan is extended to deal with changes that occur in the network over time. The initial plan is extended by first determining which communication links are subject to expiration and then creating new communication links to replace those expired links. In many cases the changes that occur in a network will be periodic and thus repeat over time. For example, the relative geometry of some satellite network systems will repeat with the orbital periods of the satellites. In networks that undergo such periodic changes, the master connection plan can be extended indefinitely. When completed, the master connection plan for these periodic networks can maintain network connectivity indefinitely. The step of extending the initial connectivity plan will be discussed in greater detail with reference to FIGS. 5 and 6.

Figure 4:
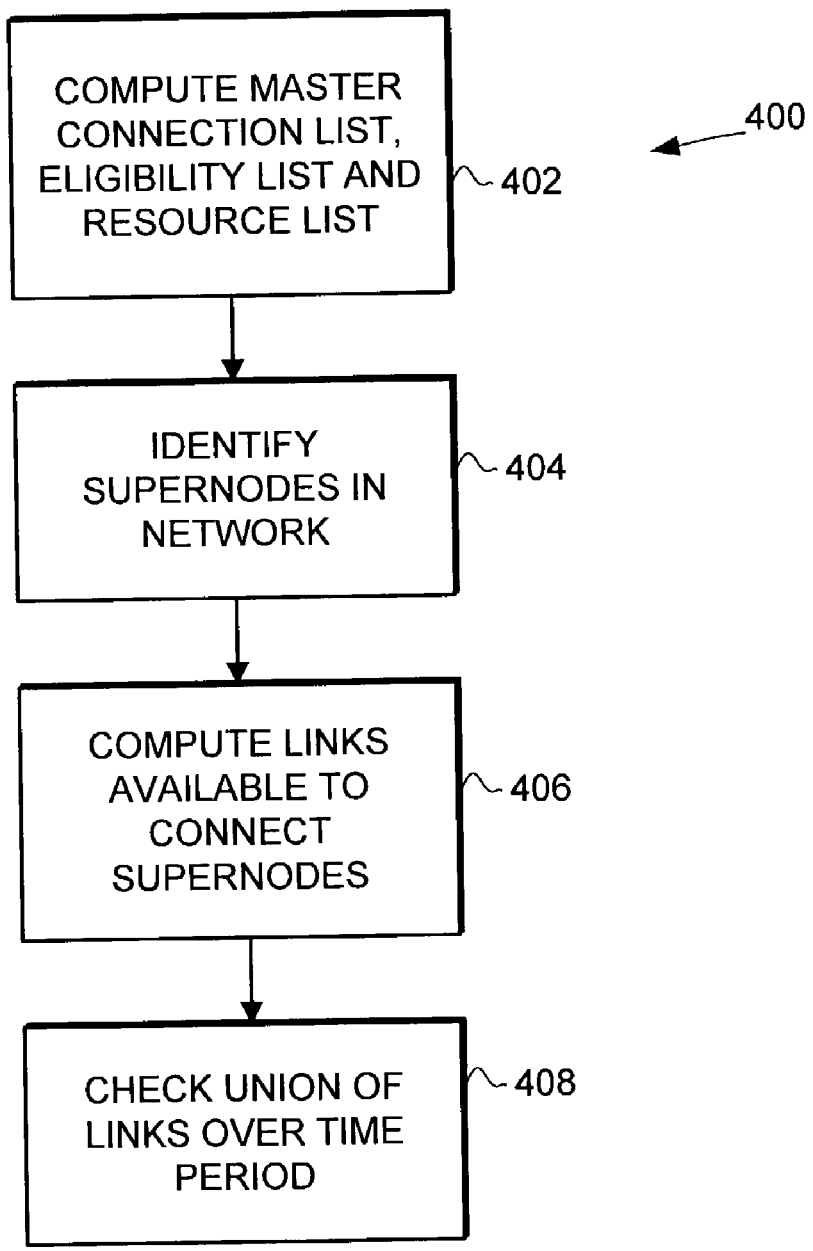

Turning now to FIG. 4, a detailed method 400 for initializing connection data and performing a feasibility check is illustrated. Method 400 illustrates steps that can be used to complete step 302 of method 300. The first step 402 is to create a master connection list, a node eligibility list, and a resource list. The master connection list is a data structure that describes the structure of the network and the dynamic links that are available and when they are available. The node eligibility list is a data structure that describes the nodes eligible for creating dynamic links, and would typically be updated as the health status of nodes in the network changes. The resource list is a time-varying data structure that describes all link resources that are available for each node at a given time.

With the initial data structures created, the next step 404 is to identify the supernodes in the network. Again, the supernodes are those groups of networks nodes that are fully connected with static links. Thus, supernodes can remain fully connected throughout the time period without requiring any dynamic links. Typically, only a failure in one or more nodes can cause a supernode to become disconnected. The supernodes can be identified using a search routine suitable to the network structure. For example, static links can be summarized into a square adjacency matrix whose dimension is equal to the number of nodes in the network. A modified DFS algorithm can then operate on this adjacency matrix to determine what combinations of nodes are connected together via static links, thereby defining supernodes within the network.

It should be noted that the preferred embodiments of the present invention use the concepts of supernodes to improve the efficiency of the processing system. Thus, a connectivity system could be implemented that does not use the concepts of supernodes. In such a system, the adjacency table would be of equal dimension to the number of live nodes in the network. In a large network, such an approach can quickly require excessive processing as network size increases. In contrast the preferred embodiment uses the supernode concept to reduce the processing used to determine which dynamic links need to be constructed. Specifically, the use of the supernode concept allows simplification because it allows the DFS algorithm used to assess network connectivity to operation on an adjacency table that is of dimension equal to the number of supernodes rather than the total number of nodes.

The next step 406 is to compute the links available to connect the supernodes. This involves reading from the master connection list the links that are available to connect the supernodes in the network and pruning from this list links involving nodes that are not on the node eligibility list.

The next step 408 is to check the union of the links between supernodes over the time period. This check helps to determine if it is possible to create a connection plan that results in a fully connected network over the entire time period of interest. If the union of the all time intervals for the available links between supernodes does not span the entire time period of interest, then it is known that a complete solution is not possible. In some cases it will be desirable to continue through the process to develop a partial solution, or the process can be stopped, depending upon specific application requirements.

Figure 5:
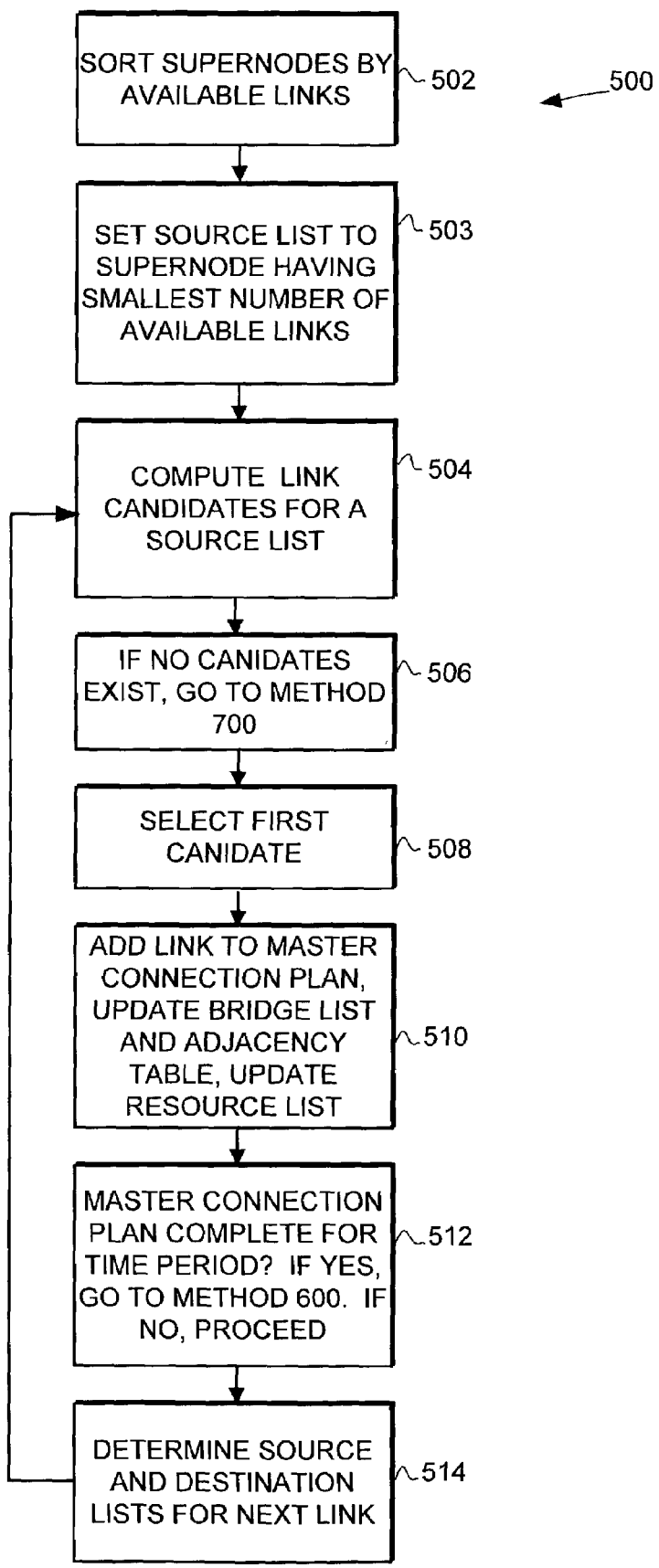
Figure 6:
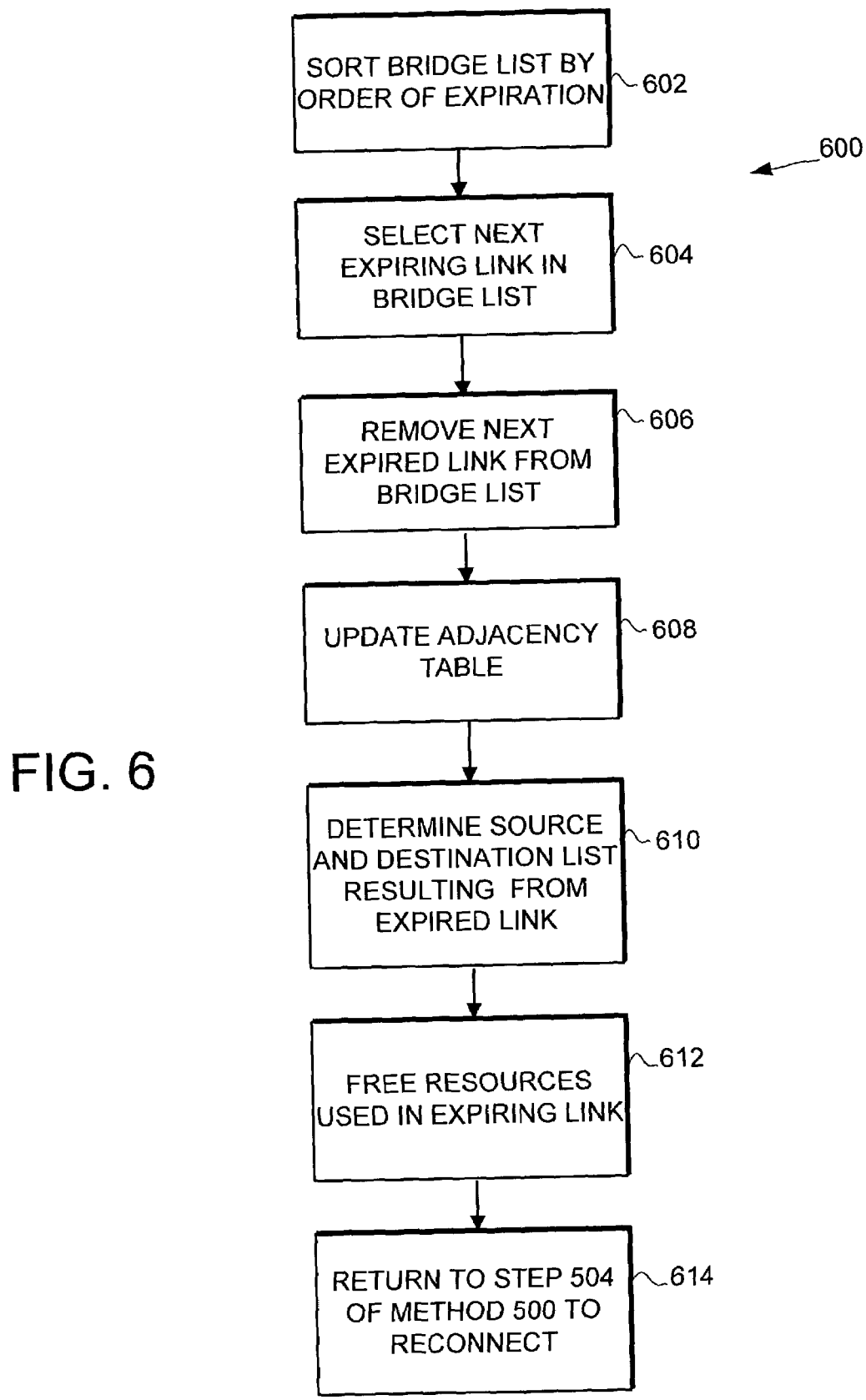

Turning now to FIG. 5, a detailed method 500 for constructing a connectivity plan is illustrated. This method would be performed after the initial data construction and feasibility check. Thus, method 500 illustrates steps that can be used to complete step 304 of method 300.

Method 500 creates a connectivity plan for a specified time period. Initially, method 500 is used to create the connectivity plan for an initial time period. Later, the method 500 will be used as needed to extend the connectivity plan for additional time periods. Specifically, the method 500 will be later used to select new links to replace expiring links. The first step 502 is to sort the supernodes by available links at the specified time period. Specifically, the list of supernodes is sorted by the number of links available to the supernode, from shortest to longest. This allows those supernodes with the fewest links to be connected first, and thus increases the probability that links can be made to all the supernodes. This can be done by creating a list for each supernode, the list including all possible links from the supernode to every other supernode. These lists are then sorted from shortest to longest to determine which supernode has the fewest number of possible links.

The next step 503 is to set the source list equal to the supernode having the smallest number of available links at the specified time. This step is performed to minimize the likelihood that resources will need to be reallocated by first ensuring that a link is established to the supernode that has the fewest potential candidates.

The next step 504 is to compute the link candidates available for the needed link as defined by the source and destination lists. Thus, step 504 computes the links available that will join any supernode belonging to the source list to any supernode belonging to the destination list at the given time, subject to constraints on resource usage and node eligibility. The link candidates are sorted in descending order of link duration. Thus, the first link candidate is that link candidate that has the longest duration.

The next step 506 is to go to method 700 if there are no candidates to link the source list to a member of the destination list. Thus, if the list of link candidates for the source supernode computed in step 504 is empty, the method 500 passes to method 700, where the network will be partially deconstructed to locate any potential alternative candidates that arise by reallocating resources. If there are link candidates available for the selected supernode, then the next step 508 is to select the first link candidate in the list of candidates. Specifically, because the link candidates are sorted in descending order of link duration, the selected candidate will be the one that has the longest duration. This assures that the candidate selected to form the dynamic link will provide that dynamic link for the longest duration possible. There are two notable advantages to selecting the link with the longest duration. The first is that it is desirable to try and keep the number of dynamic link make and breaks as small as possible. The second is that it is desirable to postpone for as long as possible the onset of the period in which the network is not fully connected.

With the link selected, the next step 510 is to add the link to the master connection plan. The link is added to the master connection plan by preferably appending three 2-tuples for the link to the master connection plan. The three 2-tuples are preferably of the form $\{\{t_b, t_e\}, \{N_1, N_2\}, \{SN_1, SN_2\}\}$, where the first 2-tuple represents the starting and ending times of the link, the second 2-tuple represents the two node ID's that comprise the link, and the third 2-tuple represents the identities of the supernodes the link connects. The bridge list is updated by adding the new link to its listing of existing links. The adjacency table is updated by changing entries corresponding to the connected supernodes to one. Additionally, the resource list is preferably updated by removing resources associated with the used link from the resource list.

With the link added to the master connection plan, the next step 512 is to determine if the master connection plan is complete for the specified time period. The master connection plan is complete for the specified time period when the all the supernodes are connected at the specified time. This occurs when the source list contains all identified supernodes and the destination list is empty. If the plan is complete for the specified time period, then control is passed to method 600, where the master connection plan is extended for additional time periods. If the plan is not yet complete, the method moves to step 514.

At step 514, the source and destination lists for the next link are determined. This can be accomplished by moving the newly connected supernode from the destination list to the source list.

After step 514 the method returns to step 504 to connect the remaining unconnected supernodes. Step 504 again computes a list of candidates to connect the new source list to a supernode in the destination list, and the first candidate in the new list is selected and added in steps 5108 and 510. Assuming it is possible to reach the fully connected state, this process continues until the network indeed reaches the connected state. Method 500 thus incrementally connects the network by joining supernodes in the source list to supernodes in the destination list. As links are made, they are added to the master connection plan. In a network that contains N supernodes, the method 500 will create N−1 links, assuming that it is indeed possible to reach the connected state Turning now to FIG. 6, a detailed method 600 for extending the connectivity plan for additional time periods is illustrated. This method would be performed after the initial master connection plan is created to initially reach the connected state. Thus, method 600 illustrates steps that can be used to complete step 306 of method 300.

The first step 602 of method 600 is to sort the bridge list by order of expiration. Again, the bridge list includes a listing of all the dynamic links in the master connection plan that have not yet expired to connect the supernodes together. As network geometry changes, some of the links become unavailable and expire. In step 602, the bridge list is sorted in increasing order of expiration; i.e., the link that will expire soonest is listed first. The next step 604 is to select the first expiring link in the bridge list. Then, at step 606 the first expiring link is removed from the bridge list.

With the expired link removed, the next step 608 is to update the adjacency table. As stated above, the adjacency table is preferably a binary square matrix that is used to indicate an existing link between supernodes i and j with a 1 in the ith column and jth row. Likewise, a 0 would indicate that no link exists. In step 608, the adjacency table is updated to reflect the expired link.

The next step 610 is to determine the source and destination lists resulting from the expired link. This can be accomplished using the adjacency table that was updated previously. Specifically, the adjacency table is a convenient input to a depth first search (DFS) algorithm used to determine if the network is connected as well as to determine the source list and destination list if the network is not connected. Preferably, the DFS algorithm searches the adjacency table and returns two lists, a source list and destination list. If the source list has length equal to the total number of supernodes in the network, then it is known that the network is connected. Otherwise, it is known that a link between a supernode in the source list and a supernode in the destination list is needed. Thus, searching through the adjacency table allows the system to determine what links are needed to reconnect the network.

The next step 612 is to free the resources from the expiring link. This includes adding the resources used by the expired link back into the resource list, where they can be used again.

Figure 7:
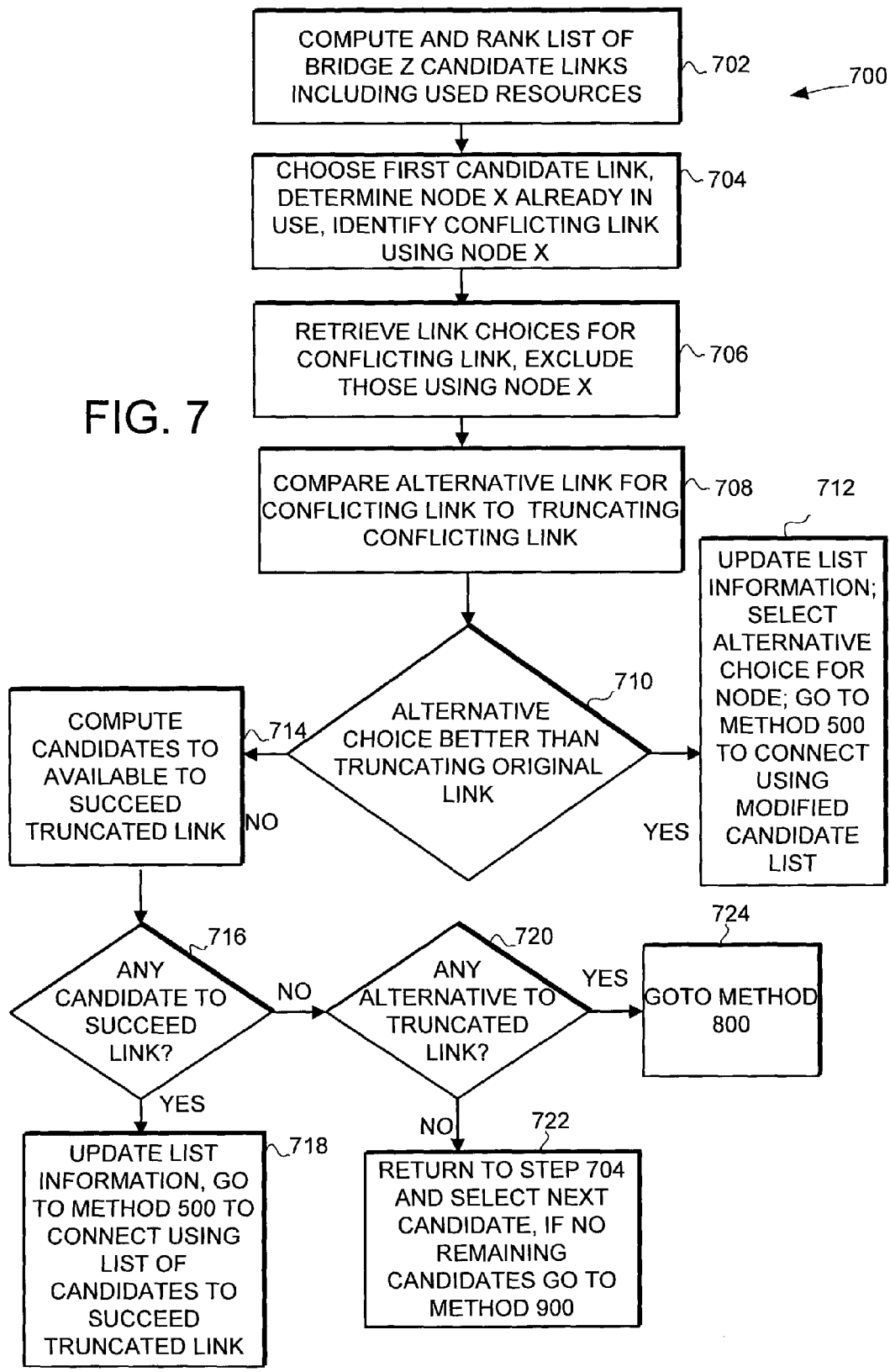

With the resources freed, the next step 614 is to return to step 504 of method 500 to reconnect the network. When returning to method 500, the specified time period would begin at the expiration of the link, or a short time earlier to account for the likelihood that establishing a link is not an instantaneous operation. Thus, method 500 can be used to find a new link to replace the expired link. If one is not readily available, then step 506 of method 500 will send the process to method 700, where the network can be disassembled to reallocate resources. If one is available, it is added to the master connection plan. The processes then returns to the beginning of method 600, where the next expiring link is located and the resources for the next expiring link are freed. The process then returns to step 504 of method 500 to find replacement links. Thus, the process bounces between methods 500 and 600, adding new links to replace expiring links. This process continues until the network is fully connected over the entire time cycle of the network Turning now to FIG. 7, a method for partially dismantling a network is illustrated. This method is used whenever there exists no available links to form a required link to complete network connectivity at a specified time. The method 700 partially dismantles the network to free resources that would otherwise be unavailable. The consequences of the dismantling are then addressed through further network connectivity processing. This method is called when needed by method 500, at step 506. Specifically, this method is called when no acceptable candidate can be found to provide a required link. In this discussion, we will refer to the required link as "bridge Z", and the time for which the link is needed as "time T".

Method 700 evaluates candidates that involve resources that are currently being used by other links, and determines if those conflicting links can be modified to maintain connectivity using an alternate set of resources. This allows the required resources to be freed for subsequent use for links which no alternatives exists. Thus, the method partially disassembles the network to free resources, and then reassembles the network to provide full connectivity.

The first step 702 to compute a list of candidate links for replacing bridge Z without excluding resources that are currently allocated to other uses. This step generates a list of all the possible bridge Z candidate links that can be used, including those that involve resources previously assigned to provide other links. Step 702 thus extends the search for link candidates beyond those searched in method 500.

The next step 704 is to choose a first candidate link from the list of bridge Z candidate links, and determine the network node that houses the resources that are currently needed but have been previously committed to another link. The node currently using the resources needed by the candidate bridge Z link for an established link will be referred to as "node X". The link that has already been defined that involves node X will be referred to as the "conflicting link".

The next step 706 is to retrieve all the link choices that met the connectivity requirements met by the conflicting link, while excluding those choices that include node X. The retrieved list of link choices will be used to find a replacement for the conflicting link. The link choices can be retrieved by determining which link in the bridge list is using node X, and the then determining the location of that link in the master connection list. The list of alternative link choices to the conflicting link can be computed by retrieving the original set of link candidates from which the conflicting link was chosen, and then removing from consideration any candidate that involves node X. This excludes from consideration those links that would have the same conflict as the conflicting link that is being replaced.

The next step 708 is to compare the alternative links for node X to simply truncating the conflicting link so that the resources of node X are available when needed. Step 708 thus compares two distinct options, the first being the list of alternative links found in step 706, the second being merely truncating the time duration of the conflicting link. Specifically, they are compared to see which option provides the longest connectivity. In some cases, an alternative link can be found that will outlast a truncated version of the conflicting link. In other cases, simply truncating the conflicting link is the best way of freeing up the needed resources from node X.

Thus, at decision step 710, if one of the alternative choices is better than truncating the conflicting link, the method moves to step 712. There, the various lists are updated by keeping only those entries that occurred prior to the conflicting link, and the method returns to method 500. Method 500 will use the modified list of candidate links generated in step 706 as a substitute for those which would normally be computed in step 504 and subsequently select the best of those alternative links to replace the conflicting link. Thus, the resources consumed by the conflicting link have been freed and the link requirements previously met by the conflicting link have been met by an alternative, the presence of which was identified in step 710 with actual replacement occurring through execution of method 500 using the alternate candidate information generated in step 706.

If at step 710, truncating the conflicting link is better than any of alternative choices, the method moves to step 714. In this option, the first conflicting link is targeted to be truncated so that the resources of node X can be used to establish bridge Z, for which no candidates were originally available. However, if a link to succeed the truncated conflicting link cannot be found, then there is no advantage to truncating the conflicting link as the network would become disconnected in either event. Thus, at step 714 a list of candidates to succeed the truncated conflicting link is computed. This can be done by first computing a temporary resource list that reflects the truncated conflicting link and treats the resources needed to form bridge Z as used. The temporary resource list can then be used to compute a sorted list of candidates to succeed the truncated conflicting link.

At decision step 716, it is determined if there is at least one candidate to succeed the truncated conflicting link. If there is, then the method goes to step 718. At step 718, the method returns to method 500. Method 500 will use the list of candidate links to succeed the truncated conflicting link generated in step 714 and select the best of those follow-on links to succeed the truncated link. Thus, the first candidate link can be used to provide the needed resource by truncating it early, and replacing it with the selected candidate to succeed the link.

If, on the other hand it is determined at step 716 that there is no candidate to succeed the truncated conflicting link, the method moves to step 720. Here decision step 720 determines if there is any alternative to the truncated conflicting link. At step 710, it was determined that there were no alternatives that were better than the truncated conflicting link. At this step, it is determined whether there are any alternatives, regardless if they are better or not. If there is an alternative, the method goes to step 724 where it passes to method 800, where those alternatives will be evaluated.

If there are no alternatives, the method goes to step 722. At step 722, the method will return to step 704 if there are more candidate links (as computed in step 702) to evaluate. Thus, the method will again go through method 700 for the other bridge Z candidate links computed in step 702 until bridge Z can be formed without creating a gap in connectivity, or until all bridge Z candidate links have been evaluated. If after evaluating all the replacement candidate links, none is found, the method at step 722 passes control to method 900.

Figure 8:
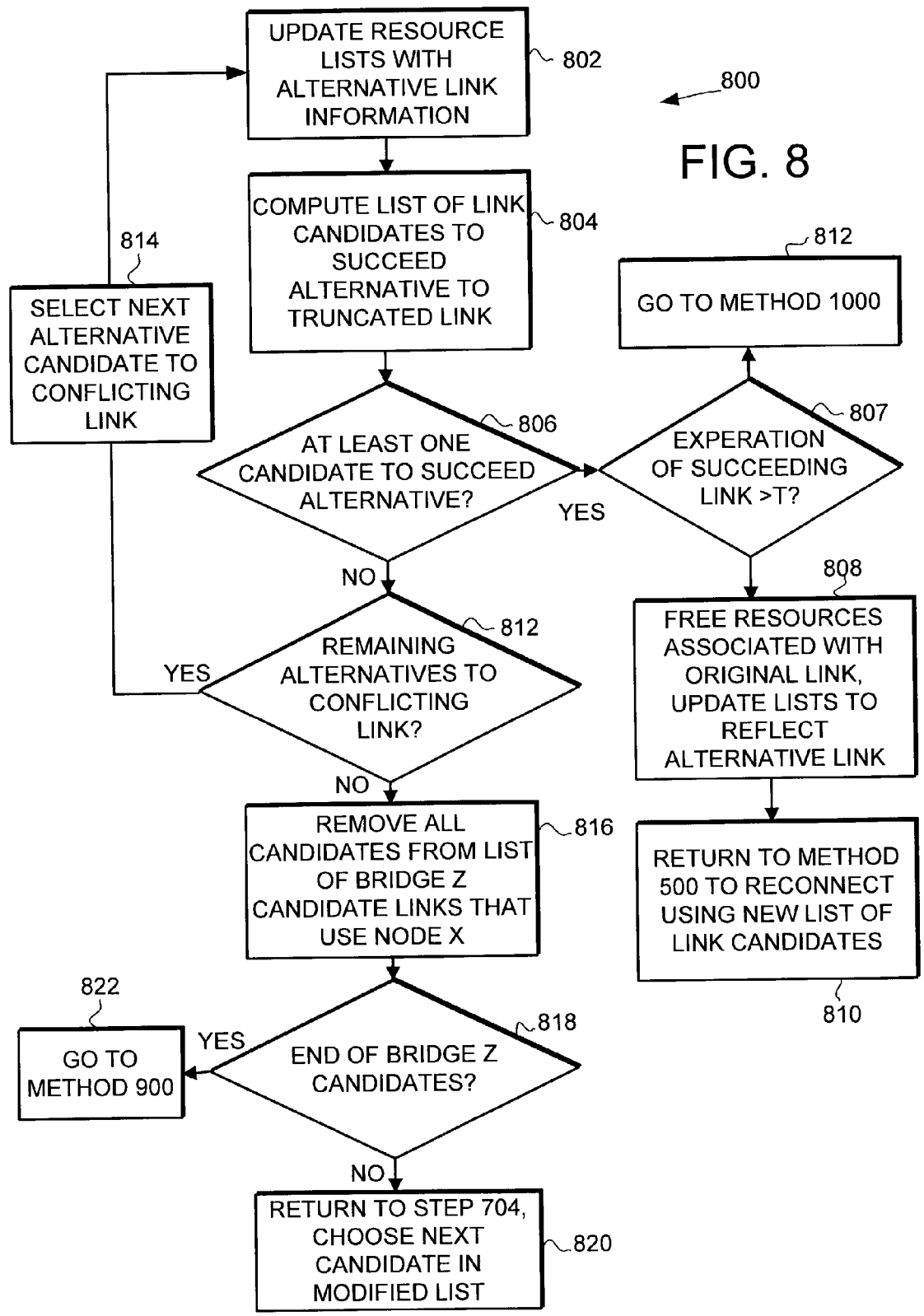
Figure 9:
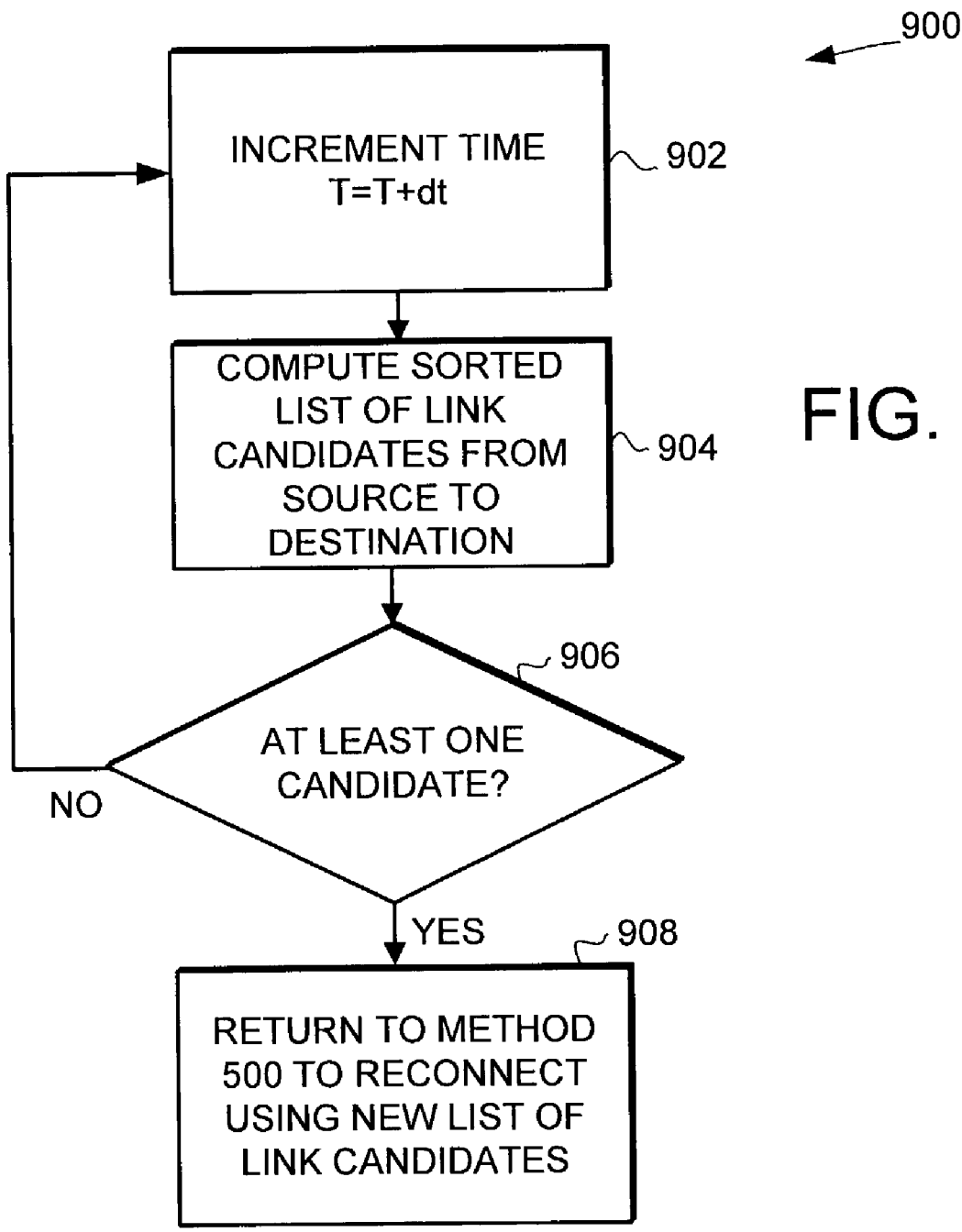
Figure 10:
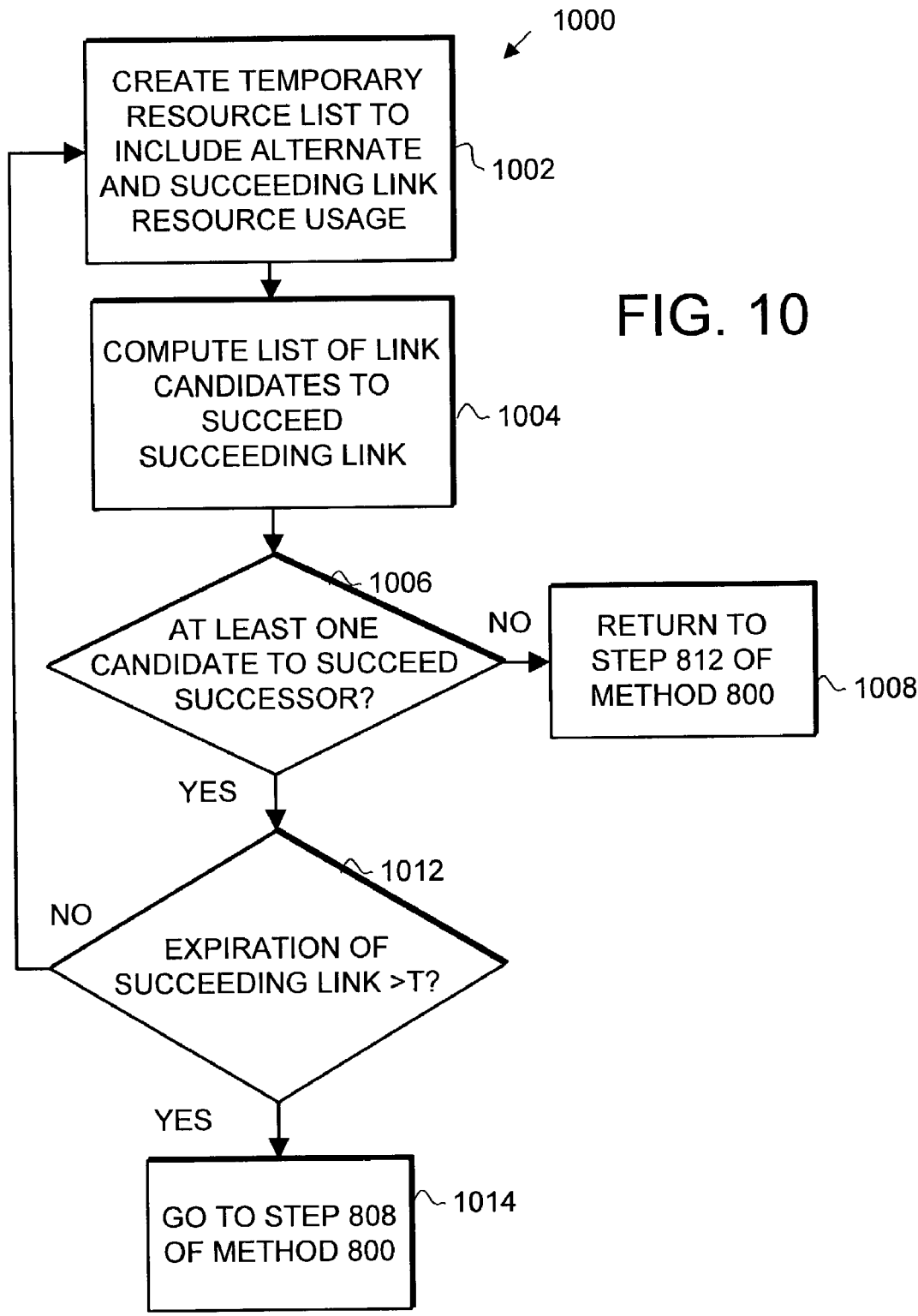

Turning now to FIG. 8, method 800 is used to evaluate the use of an alternative to the truncated conflicting link that is known to have shorter lifespan than the truncated conflicting link. In method 800, it is determined if there is another link that can be used to succeed the alternative link. If no other link to succeed the alternative link can be found, then there would be no reason to substitute it for the original because its expiration would cause a connectivity break earlier than simply truncating the conflicting link.

The first step 802 is to update the resource list to reflect the resource usage of the alternative link and to ensure that the resources associated with the proposed bridge Z link are treated as used. This creates a resource list to be used to compute all possible link candidates that can be used to succeed the alternative to the truncated link. Then, in step 804 a list of link candidates to succeed the alternative to the truncated link is computed.

At decision step 806 it is determined if there is at least one candidate to succeed the alternative link. If there is, step 807 checks to determine if the expiration of the successor to the alternative link exceeds time T. If this is the case, the method passes to step 808. If not, then the goes to step 812, where passes to method 1000. At step 808, the resources associated with the proposed bridge Z are freed, and the plan and associated lists are updated to reflect that the alternative link is going to be used in lieu of the conflicting link. Then at step 810, the method returns to method 500 to reconnect. Method 500 will use the list of link candidates to succeed the alternative to the truncated link generated in step 804 and use the best of those candidates to succeed the alternative to the conflicting link. Thus, the resources associated with the conflicting link are freed for using in forming bridge Z, with the conflicting link replaced with the alternative link found in step 720 and its successor link found in steps 808 and 810.

If at decision step 806 it is determined that there is no candidate to succeed the alternative to the truncated conflicting link, the decision step 812 determines if there are any remaining alternative candidates to the conflicting link which remain to be evaluated for succeeding links. If there are remaining candidates, the method goes to step 814 where the next alternative candidate the conflicting link is selected, then returns to step 802. Thus, all the alternative candidates for the conflicting link will be evaluated to determine if there are one or more succeeding links to the alternative candidate that when used together result in an expiration that is later than the expiration of the truncated conflicting link. If a succession of links to follow the alternative link expires prior to the expiration of the truncated conflicting link, then there is no reason to choose the alternative over the conflicting link as a failure to maintain full connectivity would occur earlier than time T. If a viable alternative candidate is located, step 808 incorporates it into the master connection plan and the relevant lists are updated to reflect the substitution of the alternative for the conflicting link. Then in step 810, control is returned to method 500 in which the list of candidates to succeed the alternative link, computed in step 804, is used in lieu of those that would be computed in step 504. If after all alternative candidates have been evaluated, and none has been determined to result in the network falling into a disconnected state at a time later than T, the method goes to step 816.

At step 816, the next step is to remove from the list of bridge Z candidates all candidate links that use node X. At this point it has been determined that none of the candidate links that use node X can be used to form bridge Z, since doing so would only result in the network falling into the disconnected state at a time earlier than time T. Thus, at step 816 all the link candidates that use node X are removed.

Then at decision step 818 it is determined if this is the end of the bridge Z candidates. If there are no more bridge Z candidates, then the method goes to step 822, where control is passed to method 900. If there are more bridge Z candidates, the method returns to step 704 in method 700, where the next candidate in the modified list of bridge Z candidates becomes the "first candidate" and is evaluated using method 700 and 800. Thus, each bridge Z candidate is evaluated to determine its conflicting link, and all the alternatives that exist for the conflicting link. These alternatives are then evaluated in method 700 to determine if they are suitable to replace the conflicting link and in method 800 to determine if a successor to the alternative exists that assures that the network cannot fall into the disconnected state at a time prior to that which would occur if bridge Z was not created at its appointed time T. This process continues until a bridge Z candidate is located that allows the network to maintain connectivity, or until all bridge Z candidates have been evaluated.

As stated above, if after evaluating all the possible replacements none is found, then the method passes control to method 900. At this point, it has been determined that full network connectivity cannot be maintained. Thus, it is known that there must be some disruption in network connectivity. Method 900 is thus used when a network disconnect occurs. Method 900 reevaluates the network at specified time intervals to determine when full connectivity can again be achieved.

The first step 902 in method 900 is to increment the time at which network connectivity will be evaluated. This is done by adding a increment of time dt to the existing time such that T=T+dt. The amount of increment dt would typically be selected the network designer in accordance with the rate at which the geometry between dynamically linked nodes changes in the system. Generally, choosing a smaller dt will result in shorter network disconnects at the expensive of requiring greater processing.

After incrementing the time and using the resource list as originally configured at time T, the next step 904 is to again compute a sorted list of candidates to form bridge Z, taking into account any resources that may have been freed up during the interim period dt and modifying the resource list accordingly.

At step 906, the list of candidates for bridge Z computed in 904 is examined to see if the list is empty. If it is, the process returns to method 700 to reexamine alternative candidates.

When there is at least one candidate, the processes proceeds to step 908. At step 908 it has been determined that bridge Z can now be formed, so control is passed to method 500. At method 500, the new list of link candidates will be used to form bridge Z.

It should be noted that the methods 700–1000, collectively attempt to delay the onset of a disconnected network as long as possible. This allows the network connectivity plan to be developed in a timely manner, without requiring the excessive processing that would be required to mathematically minimize the amount of disconnected time. This allows the network connectivity system to quickly find solutions when network connectivity problems arise. In other applications it may be desirable to modify the method to instead operate to minimize the total disconnection time of the network over a specified time interval.

In step 807 of method 800, when it is the expiration of the successor to the alternative link is less than time T step, step 812 passes to the method 1000. Method 1000 is used when an alternative link and a first successor link do not together exceed the time period of the conflicting link. Method 1000 is used to determine if additional successor links can be added that will result in a connected network at time T. If suitable additional successor links cannot be added, the method will return to step 812 of method 800 where additional alternatives to the conflicting link are evaluated. If suitable additional successor links can be added, the method returns to step 808 of method 800 where control returns to method 500 where the first successor to the alternative is added to the master connection plan. Successors will then be added until their expiration exceeds time T, at which point bridge Z will then be addressed and formed successfully.

The first step 1002 in method 1000 is to create a temporary resource list to include alternative and succeeding link resource usage. This temporary resource list is used to temporarily add the alternative link and the first succeeding link to the master connection plan, to serve as a basis for computing whether additional successor links can be added. In step 1004, a list of link candidates to succeed the first succeeding link is computed. This list will be used to determine if an additional succeeding link can be added. The list of additional successor links would be ordered by time expiration, such that the longest surviving link can be added to the master connection plan. At decision step 1006, it is determined if there is at least one additional candidate to succeed the successor link.

If there is not at least one candidate, the method goes to step 1002, and where it returns to step 812 of method 800. Thus, when it is determined that there exists no additional successor links to add to the alternative candidate and the first successor link, method 1000 returns back to method 800 where additional alternative candidates can be evaluated.

If there is at least one candidate, the method 1000 goes to step 1012. There it is determined if the combination of the alternative candidate, the first successor candidate and the additional successor candidate provides for link conductivity beyond time T.

If the combination of the alternative candidate, the first successor candidate and the additional successor candidate extends the link beyond time T, the method moves to step 1014, where it returns to step 808 of method 800. There the selected alternative candidate, the successor candidate, and the additional successor candidate are added to the master connection plan as described with reference to method 800.

If the combination of links does not extend beyond time T, the method moves back to step 1002. At step 1002, a new temporary resource list is created to reflect the alternative link, the first succeeding link, and the additional succeeding link. This temporary resource list is again used to temporarily add these links to the master connection plan, to serve as a basis for computing whether additional successor links can be added. Thus, the method goes back through steps 1004 and 1106. This process continues until the addition of additional successor links causes the link connectivity to be provided beyond time T, and thus method 1000 exits at step 1014. In the alternative, this process continues until no additional candidates to succeed the link are found, and the method 1000 exits at step 1008. Thus, method 1000 adds additional successor links until connectivity beyond time T is provided, or until no additional candidates are found. The method 1000 returns to method 800 at the step appropriate to whether or not sufficient successor links have been found.

The present invention thus provides a network connectivity system and method that facilitate the design of a network connectivity plan where the availability of link resources is limited and varies with the time. The preferred system and methods can be used to provide a network connection plan that fully connects such a network, where possible, while efficiently allocating the link resources used to implement the network connection plan. The network connectivity system and method develops the network connection plan by choosing links based on link resource availability and link duration. Thus, the network connectivity system and method creates a connection plan that, if possible, keeps full connectivity in the network, compensating for changes over time in the availability of links. The network connectivity system thus provides the ability to efficiently connect dynamic networks in a way that facilitates the routing of data between nodes in the communication network.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

The invention claimed is:

1. An apparatus comprising:
  a) a processor;
  b) a memory coupled to the processor;
  c) a network connectivity program residing in the memory and being executed by the processor, the network connectivity program configured to create a network connectivity plan for a network comprising a plurality of nodes, and wherein the network connectivity program;

evaluates the plurality of nodes to determine a plurality of supernodes, where each of the plurality of supernodes includes a subset of the plurality of nodes that can be connected with static communication links such that at least one communication path exists between any node in the supernode and any other node in the supernode;

determines a number of candidate links available for each of the plurality of supernodes at a first time period;

determines a time duration of the candidate links available for each of the plurality of supernodes at the first time period;

generates the network connectivity plan by allocating communication resources to establish dynamic communication links between supernodes to maintain the network in a connected state such that there exists at least one path between any supernode in the network and any other supernode in the network at any given time, and wherein the network connectivity program allocates communication resources according to the number of candidate links available to connect each supernode, wherein each of the plurality of supernodes is added to the network connectivity plan using a selected candidate link that is selected based on the time duration of the candidate links available.

2. The apparatus of claim 1 wherein the network connectivity program allocates communication resources according to the number of candidate links available by adding the supernodes having the fewest number of candidate links first.

3. The apparatus of claim 2 wherein the network connectivity program selects the candidate link based on the time duration of the candidate link by selecting the candidate link having the longest duration.

4. The apparatus of claim 1 wherein the network connectivity program further:
   determines an expiration time period of a expiring link in the network connectivity plan;
   determines candidate links available to succeed the expiring link; and
   selects one of the candidate links available to succeed expired candidate based on the time duration of the candidate links available to succeed the expiring link and allocates resources to establish the selected one of the candidate links.

5. The apparatus of claim 1 wherein the network connectivity program further:
   determines when no candidate link is available to connect one of the plurality of supernodes;
   determines unavailable candidate links that can connect the one of the plurality of supernodes but are currently unavailable;
   determines a conflicting link in the network connectivity plan that makes one of the unavailable candidate links unavailable; and
   selects an alternative candidate link available to replace the conflicting link and having a longest duration of all alternative candidate links and allocates resources to establish the selected alternative candidate link.

6. The apparatus of claim 5 wherein the network connectivity program compares a duration of the selected alternative candidate link with a duration of truncating the conflicting link at time needed to make the unavailable candidate link available, and selects the alternative candidate link if the selected alternative candidate link duration exceeds the duration of the truncated conflicting link.

7. The apparatus of claim 6 wherein the network connectivity program further computes candidate links to succeed the truncated conflicting link when the alternative candidate link duration does not exceed the duration of the truncated conflicting link.

8. The apparatus of claim 7 wherein the network connectivity program further computes candidate links to succeed a selected one of the alternative candidate links when the alternative candidate link duration does not exceed the duration of the truncated conflicting link and no successor candidate links to the truncated conflicting link are found.

9. The apparatus of claim 8 wherein the network connectivity program further reevaluates alternative candidates when no candidate links to succeed the selected one of the alternative candidate links are found.

10. The apparatus of claim 1 wherein the network connectivity program further determines the supernodes in the network using a depth first search algorithm.

11. The apparatus of claim 1 wherein the network connectivity program further creates a connection list of dynamic links available in the network.

12. The apparatus of claim 11 wherein the connection list comprises a table implemented such that an entry in row i and column j includes time intervals for which links between a node i and a node j are available.

13. A method for generating a network connectivity plan for a network comprising a plurality of nodes, the method comprising the steps of:
   evaluating the plurality of nodes to determine a plurality of supernodes, where each of the plurality of supernodes includes a subset of the plurality of nodes that can be connected with static communication links such that at least one communication path exists between any node in the supernode and any other node in the supernode;
   determining a number of candidate links available for each of the plurality of supernodes at a first time period;
   determining a time duration of the candidate links available for each of the plurality of supernodes at the first time period; and
   generating the network connectivity plan by allocating communication resources to establish dynamic communication links between supernodes to maintain the network in a connected state such that there exists at least one path between any supernode in the network and any other supernode in the network at any given time, the generating comprising allocating resources for adding each of the plurality of supernodes to the network connectivity plan according to the number of candidate links available to connect each supernode, wherein each of the plurality of supernodes is added to the network connectivity plan using a selected candidate link that is selected based on the time duration of the candidate links available.

14. The method of claim 13 wherein the step of adding each of the plurality of supernodes comprises adding the supernodes having the fewest number of candidate links first.

15. The method of claim 13 wherein the selected candidate link is selected based on the time duration of the candidate link by selecting the candidate link having the longest duration.

16. The method of claim 13 further comprising the steps of:
   determining an expiration time period of a expiring link in the network connectivity plan;
   determining candidate links available to succeed the expiring link; and
   selecting one of the candidate links available to succeed expired candidate based on the time duration of the candidate links available to succeed the expiring link and allocating resources to establish the selected one of the candidate links.

17. The method of claim 13 further comprising the steps of:
   determining when no candidate link is available to connect one of the plurality of supernodes;
   determining unavailable candidate links that can connect the one of the plurality of supernodes but are currently unavailable;
   determining a conflicting link in the network connectivity plan that makes one of the unavailable candidate links unavailable; and
   selecting an alternative candidate link available to replace the conflicting link and having a longest duration of all alternative candidate links and allocating resources to establish the selected alternative candidate link.

18. The method of claim 17 further comprising the step of comparing a duration of the selected alternative candidate link with a duration of truncating the conflicting link at time needed to make the unavailable candidate link available, and selects the alternative candidate Link if the selected alternative candidate link duration exceeds the duration of the truncated conflicting link.

19. The method of claim 18 further comprising the step of computing candidate links to succeed truncated link when the alternative candidate link duration does not exceed the duration of truncated conflicting link.

20. The method of claim 19 further comprising the step of computing candidate links to succeed a selected one of the alternative candidate links when the alternative candidate link duration does not exceed the duration of the truncated conflicting link and no successor candidate links to the truncated conflicting link are found.

21. The method of claim 20 further comprising the step of reevaluating alternative candidates when no candidate links to succeed the selected one of the alternative candidate links are found.

22. The method of claim 13 further comprising the step of determining the supernodes in the network using a depth first search algorithm.

23. The method of claim 13 further comprising the step of creating a connection list of dynamic links available in the network.

24. The method of claim 23 wherein the connection list comprises a table implemented such that an entry in row i and column j includes time intervals for which links between a node i and a node j are available.

25. A program product comprising:
   a) a network connectivity program, the network connectivity program configured to create a network connectivity plan for a network comprising a plurality of nodes, and wherein the network connectivity program:
   evaluates the plurality of nodes to determine a plurality of supernodes, where each of the plurality of supernodes includes a subset of the plurality of nodes that can be connected with static communication links such that at least one communication oath exists between any node in the supernode and any other node in the supernode;
   determines a number of candidate links available for each of the plurality of supernodes at a first time period;
   determines a time duration of the candidate links available for each of the plurality of supernodes at the first time period;
   generates the network connectivity plan by allocating communication resources to establish dynamic communication links between supernodes to maintain the network in a connected state such that there exists at least one oath between any supernode in the network and any other supernode in the network at any given time, and wherein the network connectivity program allocates communication resources according to the number of candidate links available to connect each supernode, wherein each of the plurality of supernodes is added to the network connectivity plan using a selected candidate link that is selected based on the time duration of the candidate links available;
   b) computer-readable media, the network connectivity program stored on the computer-readable media.

26. The program product of claim 25 wherein the network connectivity program selects the candidate link based on the time duration of the candidate link by selecting the candidate link having the longest duration.

27. The program product of claim 25 wherein the network connectivity program further:
   determines an expiration time period of a expiring link in the network connectivity plan;
   determines candidate links available to succeed the expiring link; and
   selects one of the candidate links available to succeed expired candidate based on the time duration of the candidate links available to succeed the expiring link and allocates resources to establish the selected one of the candidate links.

28. The program product of claim 25 wherein the network connectivity program further:
   determines when no candidate link is available to connect one of the plurality of supernodes;
   determines unavailable candidate links tat can connect the one of the plurality of supernodes but are currently unavailable;
   determines a conflicting link in the network connectivity plan that makes one of the unavailable candidate links unavailable; and
   selects an alternative candidate link available to replace the conflicting link and having a longest duration of all alternative candidate links and allocates resources to establish the selected alternative candidate link.

29. The program product of claim 28 wherein the network connectivity program compares a duration of the selected alternative candidate link with a duration of truncating the conflicting link at time needed to make the unavailable candidate link available, and selects the alternative candidate link if the selected alternative candidate link duration exceeds the duration of the truncated conflicting link.

30. The program product of claim 29 wherein the network connectivity program further computes candidate links to succeed the truncated conflicting link when the alternative candidate link duration does not exceed the duration of the truncated conflicting link.

31. The program product of claim 30 wherein the network connectivity program further computes candidate links to succeed a selected one of the alternative candidate links when the alternative candidate link duration does not exceed the duration of the truncated conflicting link and no successor candidate links to the truncated conflicting link are found.

32. The program product of claim 31 wherein the network connectivity program further reevaluates alternative candidates when no candidate links to succeed the selected one of the alternative candidate links arc found.

33. The program product of claim 25 wherein the network connectivity program further determines the supernodes in the network using a depth first search algorithm.

34. The program product of claim 25 wherein the network connectivity program further creates a connection list of dynamic links available in the network.

35. The program product of claim 34 wherein the connection list comprises a table implemented such that an entry in row i and column j includes time intervals for which links between a node i and a node j are available.

* * * * *

UNITED STATES PATENT AND TRADEMARK OFFICE
CERTIFICATE OF CORRECTION

PATENT NO.        : 7,225,258 B2
APPLICATION NO. : 10/238171
DATED             : May 29, 2007
INVENTOR(S)      : Orcutt et al.

It is certified that error appears in the above-identified patent and that said Letters Patent is hereby corrected as shown below:

In Column 20, line 17, delete "tat" and add -- that --.

Signed and Sealed this

Seventh Day of August, 2007

JON W. DUDAS
*Director of the United States Patent and Trademark Office*